United States Patent [19]

Dickson

[11] 4,059,048
[45] Nov. 22, 1977

[54] MEANS OF FUMIGATING RAW AND FINISHED AGRICULTURAL PRODUCTS

[76] Inventor: Robert Daniel Dickson, 2110 S. Prairie, Stuttgart, Ark. 72160

[21] Appl. No.: 684,084

[22] Filed: May 7, 1976

[51] Int. Cl.² .............................................. A23L 3/34
[52] U.S. Cl. ...................................... 99/482; 21/109; 426/320
[58] Field of Search ...................... 21/91, 109; 99/482, 99/485, 467, 646 S, 471; 43/129, 125; 98/55; 426/312, 320

[56] References Cited

U.S. PATENT DOCUMENTS

| 235,960 | 12/1880 | Poraetorius | 21/109 X |
| 643,769 | 2/1900 | Kitchen | 43/125 X |
| 1,552,082 | 9/1925 | Riley | 21/109 X |
| 1,928,903 | 10/1933 | Manning | 21/109 |
| 2,397,292 | 3/1946 | Salle | 21/109 X |
| 3,252,402 | 5/1966 | Burmeister | 98/55 |
| 3,554,688 | 1/1971 | Cassidy | 21/109 X |

Primary Examiner—S. Leon Bashore
Assistant Examiner—Kenneth M. Schor
Attorney, Agent, or Firm—Hill, Gross, Simpson, Van Santen, Steadman, Chiara & Simpson

[57] ABSTRACT

An elongated pipe installed the depth of a bulk storage bin or silo for raw or finished agricultural goods receives through a capped exterior access opening a supply of solid chemical fumigant for producing phosphine gas. The buildup of gas in the pipe creates pressure so that the gas exits through hooded ports formed in the pipe to permeate and saturate the bulk goods in the bin and to kill pests therein. Residual fumigant is removed from the pipe.

14 Claims, 3 Drawing Figures

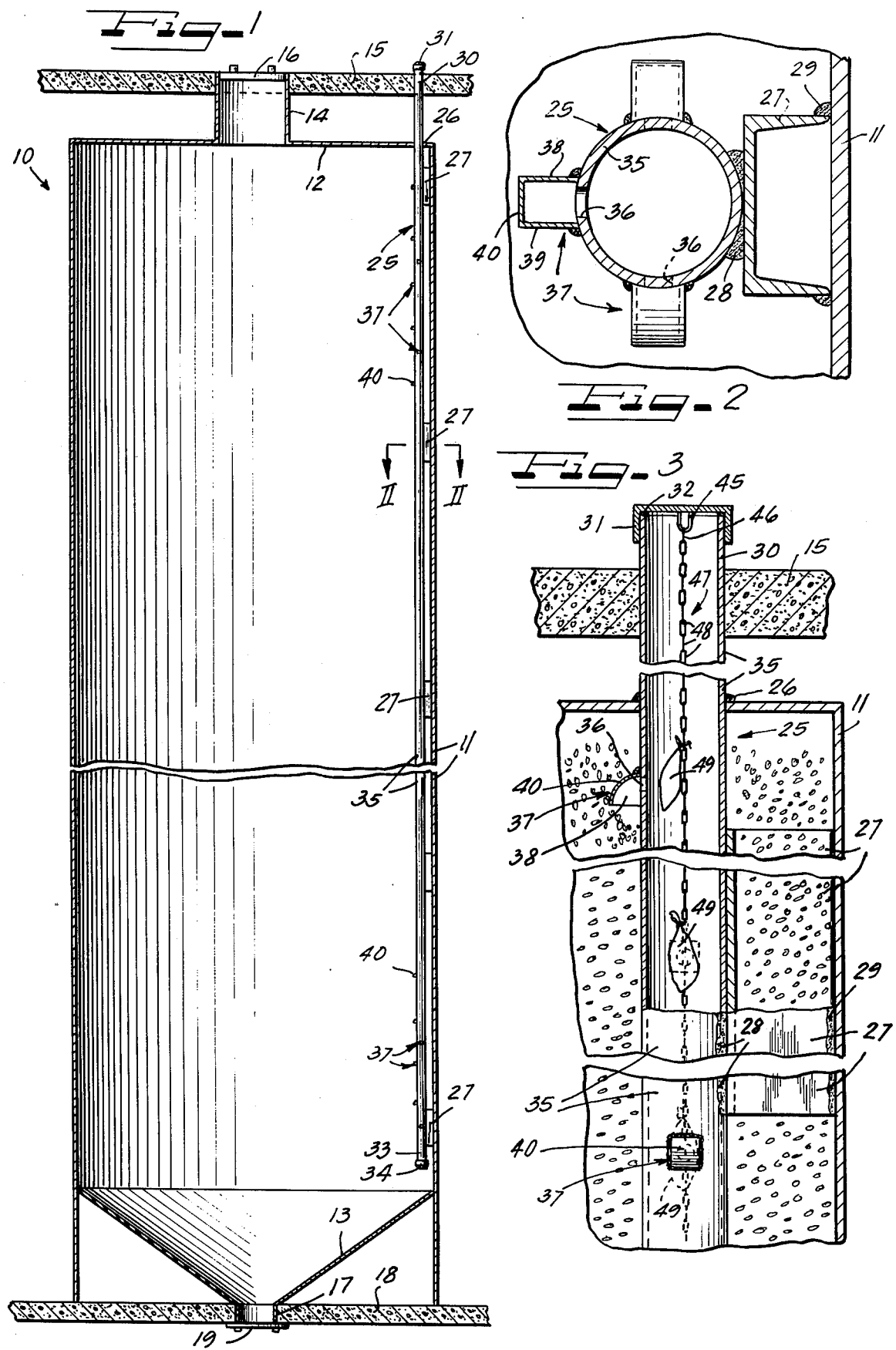

MEANS OF FUMIGATING RAW AND FINISHED AGRICULTURAL PRODUCTS

BACKGROUND OF THE INVENTION

1. Field of the Invention

The present invention relates to means for storing and fumigating bulk agricultural goods such as grains.

2. The Prior Art

When stored for any length of time, both raw and finished agricultural products, primarily grains, may become infested with insects and other living matter. Current fumigation techniques utilize solid and liquid chemicals convertible to gases for passage throughout the silo or other storage area. The primary liquid chemical used is methyl bromide. When mixed with air, the liquid turns into a gas which is then circulated and recirculated throughout the storage area, using expensive equipment. The liquid fumigant may be used for lightly packed raw and finished products, but in each case equipment and energy are required for circulation of the air and gas mixture, and no recirculation can occur in dense finished products such as flour.

The primary solid chemical used produces phosphine gas when exposed to air. In the case of raw agricultural products, the solid, in the form of pellets or sachets or small bags, is placed directly in the grain in the silos or storage bins. The grain must be constantly turned during the introduction of the chemical, a process which takes up to eight hours and which involves considerable trouble and expense in the physical handling of the product. Once the pellets or bags are evenly distributed throughout the grain, it requires some 72 hours for the chemical to turn into gaseous form, after which there is a powdery residue. Such residue is left in the bags whereupon the bags may be retrieved or if in pellet form, the residue may be left in the product with no ill effects.

In the case of processed or finished agricultural products, the solid chemical may not be applied directly to the grain. Governmental regulations will approve such use of phosphine gas only when the powdery residue is retained or recovered. No method is presently known or used whereby such residue can be reliably retained or recovered thereby precluding the use of solid fumigants in connection with finished agricultural products.

SUMMARY OF THE INVENTION

The new method and apparatus utilizes a solid chemical such as commercially available for producing phosphine gas. In accordance with the present invention, a gas generating chamber is formed in the interior of the storage container means which has an access opening so that solid chemical may be introduced gravitationally. The equipment includes, for example, a 3 inch pipe installed the depth of the silo or other storage bin. Holes or openings are provided in the pipe at selected intervals, for example located at 0°, 90° and 180° at each axial interval, and each hole is covered with a shield protruding from above the hole on the outside of the pipe and in the approximate shape of an inverted half-cup. The top end of the pipe extends into an accessible position above the top of the silo or bin and is closed with a gas-proof cap. The pipe is large enough to accommodate gravitational insertion of a chemical for generating gas. For example, a chain may be lowered into the pipe, on which are attached small bags or sachets containing a solid chemical fumigant whereby the fumigant may be suspended at different selected levels within the pipe. Once the bags are lowered into the pipe and the pipe sealed, exposure of the solid chemical to air produces the phosphine or other gas. The buildup of the gas in the pipe creates enough pressure to force the gas out of the holes in the pipe and to disperse the gas to saturate all the grain in the storage bin. The shield over each hole prevents grain from entering the pipe. Complete fumigation takes 72 hours at warm temperatures after which the pipe may be opened and any chemical residue removed, for example, the chain with the bags still attached may be removed from the pipe. Powdered residue of the solid agent remains in the bags and is captured as the bags are removed from the chain, thereby leaving the contents of the storage bin inviolate.

BRIEF DESCRIPTION OF THE DRAWINGS

FIG. 1 is a side, sectional view longitudinally through a storage bin incorporating the principles of the present invention.

FIG. 2 is a detailed, end sectional view taken on line II—II of FIG. 1.

FIG. 3 is a detailed, longitudinal section view partially broken to show additional features of the present invention.

DESCRIPTION OF THE PREFERRED EMBODIMENTS

FIG. 1 shows in longitudinal section a bulk storage bin or silo 10 for receiving and storing raw or finished agricultural goods such as rice, oats, wheat, milo, flour, and similar products. The silo 10 has a side wall 11 and a top wall 12 and a bottom wall 13 each sealingly joined thereto. The top wall 12 has a filling port 14 therethrough which engages and is held by a top support wall 15. The filling port 14 receives therein a gas-tight seal 16. Similarly, the bottom wall 13 of the bin or silo 10 has an outlet port 17 engaged with a bottom support wall 18, and the port 17 is closed by a seal 19.

In accordance with the principles of the present invention, in order to penetrate the coherent aggregate mass of agricultural materials by forming a vertically extending through passage therein, a hollow, apertured, elongated pipe is installed substantially the entire depth of the bin or silo 10, which pipe may be made of either metal or plastic or any other suitable rigid material capable of forming a gas generating chamber. In the embodiment shown, the pipe 25 comprises a standard 3 inch metal pipe which extends through the top wall of the silo 10 and is sealed thereabout at 26. The pipe 25 is attached to the side wall 11 of the silo 10 upon mounting brackets 27. Where the container or pipe 25 is a metal pipe, the seals and attachments may be made by welding as at 28; where the container or pipe 25 is plastic, any suitable compatible adhesive may be used. The brackets 27 are conveniently made of metal and are welded to the side wall 11 as at 29.

The container or pipe 25 extends vertically as shown in FIG. 1. It extends upwardly and outwardly of the top support wall 15 to an end 30 disposed in accessible location and which forms an access opening A which receives thereover a removable end cap 31 carrying a gas-tight seal 32 as shown in FIG. 3. A lower end 33 of the container or pipe 25 extends substantially to the bottom of the silo 10 superjacent the bottom wall 13. The bottom end 33 of the container 25 is permanently closed and sealed by a closure cap 34.

As shown in each of the Figures and in the detail of FIG. 2, the container or pipe 25 has a side wall 35 in which is formed a plurality of longitudinally spaced apertures 36. Such apertures are distributed about the periphery of the wall 35 in spaced relationship and in the exemplary form shown, are situated at 90°, 180° and 270° in either direction from the center of the attachment line between the container or pipe 25 and the brackets 27.

In order to prevent the contents of the storage bin 10 from entering the pipe 25, each aperture 36 has a shield 37. Each such shield 37 has side walls 38, 39 and an arcuately curved top and side wall portion 40. The wall 40 connects to the side wall 35 of the pipe just above the aperture 36, and the three walls 38, 39, 40 extend downwardly well below the bottom of each aperture 36 thereby to form a horizontally and vertically extending protective shield.

The pipe 25 has the effect of forming a gas generating chamber which penetrates the interior of an aggregate mass of particulated agricultural products confined within the bin or silo.

In order to produce a supply of phosphine gas within the container or pipe 25 so that such gas will permeate the contents of the entire bin, it is contemplated by the present invention that a solid gas generating chemical will be gravitationally introduced through the top of the pipe 25 through the access opening A normally closed by the cap 31. For example, in one form of the invention, the chemical may be placed in packets or sachets or bags and lowered into the pipe for suspension of selected quantities of the solid chemical at selected levels within the gas generating chamber. To effect that end, as shown in FIG. 3, the end cap 31 at the top of the container or pipe 25 has a hook or eye 45 on the inner, axially-facing surface thereof to engage an upper end 46 of a lowering and raising means which may take the form of a multi-link chain or other flexible connector means shown at 47. The chain is sized to fit readily within the interior of the pipe 25 through the access opening A and the chain 47 has individual links 48 to which may be readily attached any desired number of packets or sachets or bags 49 in which solid, gasifying, fumigating agent may be placed. The chain 47 extends substantially to the bottom 33 of the pipe 25, providing for great flexibility in the spacing and positioning of the packets 49 at different selected levels within the gas generating chamber.

The packets 49 may contain any desired solid form of chemical fumigating agent. Once such agent commercially available for such use contains as an active ingredient aluminum phosphide which releases poisonous phosphine gas. One such product which is distributed in the United States by Research Products Company of Salina, Kans. 67401, is identified under the designation "DETIA Gas-Ex-B." DETIA Gas-Ex-B is an aluminum phosphide preparation pre-packed into special paper sachets or bags which liberate poisonous phosphine gas ($PH_3$-Hydrogen Phosphide) once removed from the can and exposed to atmospheric air and moisture. DETIA Gas-Ex-B is effective in providing economic levels of control of certain insects injurious to grain, other raw agricultural commodities, specified processed foods, animal feeds, seed grain and tobacco. It will be understood, of course, that other toxic gas may be utilized within the principles of the present invention. Solid powder or pellets of chemical fumigant are generally permeable to air and phosphine gas but impermeable to passage of materials, particularly residual powder, from within the bags or sachets.

Once the bags 49 are lowered into the pipe 25 and the pipe is sealed by fastening the gas-proof cap 31, the mixture of air and solid chemical produces the phosphine or other gas. The buildup of gas in the pipe 25 creates enough pressure to force the gas out of the tube 25 and disperses throughout the bin 10 to saturate all of the grain therein contained. Thus, as the reaction proceeds, the gas released will fill the container or pipe 25 and escapes through the apertures 36 into the interior of the silo or bin 10. The fumigating gas will disperse throughout the grain or other contents of the silo 10, thoroughly fumigating the grain and providing an economic level control of undesired insects.

In operation, once the silo has been filled with grain through the fill port 14, the top seal 16 is replaced to minimize contamination of the interior of the silo 10. When fumigation is desired, the end cap 31 on the pipe 25 is removed from the end 30 thereof above the top support wall 15, and the chain 47 drawn from the pipe 25.

The quantity of fumigating agent desired to be used is made available and individual packets 49 of such agent are affixed to individual links 48 of the chain 47 and are spaced apart along the length of the chain 47 by any appropriate spacing which will permit the full quantity of fumigating agent required to be gravitationally introduced through the access opening A into the pipe 25. Then the chain 47 with packets 48 thereon is quickly lowered into the pipe 25, which is kept free from the agricultural products within the silo 10 by the shields 37 over the apertures 36. The end cap 31 is screwed tightly to the end 29 of the pipe 25 effecting a gas-tight seal of the access opening A at 32 between the interiors of the container 25 and the silo 10 and the outside atmosphere.

Gasification of the solid agent from within the bag 49 will begin to occur upon contact with air and will proceed at a rate depending upon the temperature conditions. Once the fumigating gas has been fully released, the powder residue remaining within the bags may be conveniently removed from the silo 10 by removing the end cap 31 from the pipe 25 and withdrawing the chain 47 with the packets 49 thereon and still intact. The packets 49 are removed from the chain 47 and disposed of. Generally however, the silo 10 and the pipe 25 will be left sealed until the contents of the silo 10 are to be used, whereupon in accordance with government regulations, the silo 10 is aerated and the fumigating gas dispersed. The residual fumigant can be removed so that the contents of the storage bin remain entirely inviolate. By virtue of the sealed closure 34 at the lower end of the hollow container 25 residue from the solid fumigant agents is prevented from escaping from the bottom of the hollow container.

By practicing the present invention, no recirculation requirements or expenses associated with the conventional liquid method of fumigation and known methods of use of solid fumigants are required. The agricultural products are not subjected to the damage of turning, and very little labor and time to accomplish fumigation is required. Since the packets 49 of solid fumigants are always recovered and in any event are contained in isolation within the pipe 25, the method and apparatus disclosed is particularly applicable for use with processed grains such as rice and oats.

It will be appreciated by those skilled in the art that many variations in the specific illustrative structure or layout of the apparatus herein described may be made while still utilizing the principles of the invention herein disclosed. Thus, any manner of container 25 may be employed within the silo 10 provided that the container 25 has apertures 36 communicating the interior of the container 25 with the interior of the bin or silo 10 and that some means of access to the interior of the container 25 be provided through a port in a wall of the silo or bin 10, as at 31 in the present embodiment. The apertures 36 may, of course, be spaced in any desired arrangement, in any container affording convenient exterior access besides a pipe 25 may be employed.

Although various other modifications may be suggested by those versed in the art, it should be understood that I wish to embody within the scope of the patent warranted hereon all such modifications as reasonably and properly come within the scope of my contribution to the art.

I claim as my invention:

1. A fumigating apparatus comprising:
   container means for confining a coherent aggregate mass of particulate agricultural materials,
   an elongated member extending the depth of the container means and forming a passage-like gas chamber extending vertically through the interior of the coherent aggregate mass confined within the container means,
   a closure sealing said elongated member at its bottom end;
   said member having a top end extending out of said container means;
   said top end having an upwardly directed opening formed therein for said gas chamber disposed at an accessible exterior location relative to said container means,
   cap means for selectively closing said access opening and including support means within said chamber at said opening when the cap means are in closed position,
   fumigant suspension means connected to said support means and gravitationally insertable into and suspendable within said gas chamber through said access opening whereby selected quantities of solid gas generating fumigant are suspended at different selected levels in said gas chamber,
   said cap means have sealing means for closing and sealing said gas chamber at said access opening so that pressure build up will occur when said fumigant in said chamber changes to a gaseous form, and
   spaced ports in said elongated member for directing the pressurized gas outwardly into the coherent mass to permeate and saturate the agricultural products,
   said cap means being removable from the access opening, whereby said support means together with said fumigation means and any residual fumigant may then be removed from the gas chamber through said access opening.

2. A fumigating apparatus as defined in claim 1 wherein said means for suspending solid gas generating fumigant comprises a link chain with bags connected to the links of said chain at selected intervals along the length thereof.

3. A fumigating apparatus as defined in claim 1 wherein said elongated member comprises a pipe having apertures formed therein at spaced locations along the length of the pipe.

4. The apparatus defined in claim 1, wherein each said port in said hollow member has a horizontally-projecting shield protecting said container means from entry of said agricultural products through said ports.

5. The apparatus defined in claim 1, wherein said member comprises a pipe.

6. The apparatus defined in claim 5, wherein said pipe is straight and is oriented vertically in said container means.

7. The apparatus defined in claim 6, wherein said pipe extends vertically along a side wall of said container means, and means fixedly securing said pipe to said side wall.

8. The apparatus defined in claim 7, wherein sequential ones of said ports are spaced circumferentially apart about said pipe successively at 90°, 180°, and 270° clockwise from said rigid connection.

9. The apparatus defined in claim 6, wherein each said port in said pipe is fitted with an overhanging, vertically and horizontally extending shield to avoid entry of said agricultural products into said pipe.

10. An apparatus for storing and fumigating raw and finished bulk agricultural goods with a solid agent and facilitating complete recovery of residual powder, comprising:
    a storage bin with a top wall having a sealable top opening for introduction of bulk agricultural products into said bin, a bottom wall having a sealable bottom opening for dispensing said products from said bin, an enclosing side wall sealingly joined to said top and bottom walls, and a sealable port through one of said walls;
    sealing means for selectively closing and sealing said openings and sealing means for selectively closing and sealing said port,
    a hollow container mounted within said storage bin having an interior forming a gas generating chamber and having a wall opening accessible from outside said storage bin walls through said port, and apertures formed in a wall of said container interiorly of said bin to communicate the interiors of said gas generating chamber and said bin;
    a closure sealing the bottom end of said hollow container; and suspension means hanging down inside said container and suspended from said port sealing means said suspension means receiving and suspending in said container at least one packet of solid gas generating agent interiorly of said hollow container, said suspension means being withdrawable from said container through said port for facilitating removal of said packet from said container,
    whereby fumigant gas produced from said solid agent escapes from said hollow container into said storage bin through said apertures to saturate agricultural goods stored in said bin and residue from said solid agent is readily recovered from said bin in said packet and whereby said closure prevents the residue from said solid agent from escaping from the bottom of the hollow container.

11. The apparatus defined in claim 10, wherein said suspension means comprises a chain freely receivable in said container through said port, and a tie means for connecting each said packet to said chain.

12. The apparatus defined in claim 10, wherein said means for suspending said solid agent packet in said container comprises an elongate flexible member having a plurality of connection points for receiving thereon a plurality of the packets of solid agent.

13. The apparatus defined in claim 12, wherein said member comprises a chain and said connection points comprise discrete, interconnected links forming said chain.

14. The apparatus of claim 12, wherein said elongate member is connected to a cap member sealing said port, thereby to in said elongate member into said container.

* * * * *

UNITED STATES PATENT AND TRADEMARK OFFICE
CERTIFICATE OF CORRECTION

PATENT NO. : 4,059,048
DATED : Nov. 22, 1977
INVENTOR(S) : Robert Daniel Dickson It is certified that error appears in the above—identified patent and that said Letters Patent are hereby corrected as shown below:

Column 8, line 2, after "to", cancel "in" and substitute --suspend--; same line, cancel "into" and substitute --in--.

Signed and Sealed this

Fourth Day of July 1978

[SEAL]

Attest:

RUTH C. MASON
Attesting Officer

DONALD W. BANNER
Commissioner of Patents and Trademarks